United States Patent
Benveniste

(10) Patent No.: US 6,314,294 B1
(45) Date of Patent: Nov. 6, 2001

(54) METHOD FOR SELF-CALIBRATION OF A WIRELESS COMMUNICATION SYSTEM

(75) Inventor: Mathilde Benveniste, South Orange, NJ (US)

(73) Assignee: AT&T Corp., New York, NY (US)

(*) Notice: Subject to any disclaimer, the term of this patent is extended or adjusted under 35 U.S.C. 154(b) by 0 days.

(21) Appl. No.: 09/222,912

(22) Filed: Dec. 30, 1998

Related U.S. Application Data

(60) Division of application No. 08/736,871, filed on Oct. 25, 1996, which is a continuation-in-part of application No. 08/634,713, filed on Apr. 18, 1996.

(51) Int. Cl.$^7$ ....................................... H04B 7/00

(52) U.S. Cl. ................ 455/452; 455/62; 455/63

(58) Field of Search .................... 455/422, 445, 455/458, 450, 452, 453, 455, 62, 63, 67.1, 522, 68, 69

(56) References Cited

U.S. PATENT DOCUMENTS

| | | |
|---|---|---|
| 3,764,915 | 10/1973 | Cox et al. . |
| 4,128,740 | 12/1978 | Graziano . |
| 4,144,411 | 3/1979 | Frenkiel . |
| 4,144,496 | 3/1979 | Cunningham et al. . |
| 4,249,181 | 2/1981 | Lee . |
| 4,355,411 | 10/1982 | Reudink et al. . |
| 4,670,906 | 6/1987 | Thro . |
| 4,726,050 | 2/1988 | Menich et al. . |
| 4,730,187 | 3/1988 | Menich et al. . |
| 4,775,998 | 10/1988 | Felix et al. . |
| 4,797,947 | 1/1989 | Labedz . |
| 4,914,651 | 4/1990 | Lusignan . |
| 4,932,049 | 6/1990 | Lee . |
| 4,965,850 | 10/1990 | Schloemer . |
| 5,111,534 | 5/1992 | Benner . |
| 5,127,100 | 6/1992 | D'Amico et al. . |
| 5,134,709 | 7/1992 | Bi et al. . |
| 5,404,574 | 4/1995 | Benveniste . |
| 5,481,588 | 1/1996 | Rickli et al. . |
| 5,491,837 | 2/1996 | Haartsen . |
| 5,551,057 | 8/1996 | Mitra . |
| 5,559,789 | 9/1996 | Nakano et al. . |

FOREIGN PATENT DOCUMENTS

| | | |
|---|---|---|
| 0 297 062 | 12/1988 | (EP) . |
| 0 731 622 | 9/1996 | (EP) . |
| 0 802 695 | 10/1997 | (EP) . |
| 2438389 | 6/1980 | (FR) . |
| 2220326A | 1/1990 | (GB) . |
| 61-64725 | 3/1986 | (JP) . |
| 90/10342 | 9/1990 | (WO) . |
| 96/33589 | 10/1996 | (WO) . |

OTHER PUBLICATIONS

Stephen W. Gibson, "Cellular Mobile Radiotelephones," Prentice–Hall, Inc. 1987, p. 22, Chap. 3, p. 41, 42, 44, 45, 63, 64, Chap. 5, p. 85, 122, 133, 135, 136, 141.

Nomura et al., "Multiple Radio Zone Plans in Mobile Radio Systems", IEEE Transactions on Vehicular Tech; vol. VT–25, No. 3, Aug. 1977, p. 68–74.

A.N. Rosenberg, "The Non–Regular Optimal Voice–Channel Assigner (NOVA) for Cellular" AT&T Bell Laboratories, Mar. 1986.

(List continued on next page.)

*Primary Examiner*—Thanh Cong Le
(74) *Attorney, Agent, or Firm*—Morgan & Finnegan, LLP

(57) ABSTRACT

Self RF engineering is made possible for a wireless communication system by adding to the self-configuration capability the ability to set autonomously the power levels of the system base stations. The same data is employed as in self configuration. A further improvement for systems using the IS 136 Air Interface Standard consists of the capability to collect the required data through the functionalities of the MAHO/MACA (Mobile Assisted Hand Off/Mobile Assisted Channel Assignment). Improved system-initialization procedures are presented.

17 Claims, 10 Drawing Sheets

OTHER PUBLICATIONS

R.J. Pennotti, Channel Assignment in Cellular Mobile Telecommunications Systems:, UMI Dissertation, pp. 27–31, 198–210, 1976.

M. Benveniste, "A Model for Cellular Systems and Design and Evolution", AT&T Bell Laboratories, pp. 1–18, Sep. 1989.

M. Benveniste, "A Prototype Model for Non–Regular Channel Assignment," AT&T Bell Laboratories, pp. 1–18, Jan. 1990.

M. Benveniste, "An Optimization Model for Non–Regular Channel Assignment in Wireless Communications Networks," AT&T Bell Laboratories, Jun. 1992, pp. 1–47.

J. Llewellyn et al., "Linear Programming Software for Personal Computers", ORMS Today, pp. 35–47, Oct. 1990.

W.C.Y. Lee, "New Cellular Schemes for Spectral Efficiency", IEEE Transactions on Vehicular Tech., pp. 188–192, Nov. 1987.

S.C. Schwartz et al., "On the Distribution Function and Moments of Power Sums with Log–Normal Components," Bell Journal, pp. 1441–1462, Sep. 1982.

G.B. Dantzig et al., "The Decomposition Algorithm for Linear Programs," Econometrica, pp. 767–778, Oct. 1961.

W.C. Lee, "Elements of Cellular Mobile Radio Systems," IEEE Transaction on Vehicular Tech., pp. 48–56, May 1986.

Tajima et al., "A Strategy for Flexible Channel Assignment in Mobile Communication Systems," IEEE Transactions on Vehicular Tec., pp. 92–103, May 1988.

"Alta Frequenza", vol. 57, No. 2, Mar. 1988, Milano, Italy, pp. 89–96, Gamst "A Resource Allocation Technique for FDMA Systems".

VCA     VOICE CHANNEL ADMINISTRATION
TLSTA   TRAFFIC LOAD STATISTICS ESTIMATION
TLCT    TRAFFIC LOAD CHANGE TEST
SISTAT  SERVING SIGNAL AND INTERFERENCE STATISTICS ESTIMATION
REALL   COMPUTATION OF A NEW CHANNEL ALLOCATION
SIMEAS  SERVING SIGNAL AND INTERFERENCE MEASUREMENTS
TMEAS   TRAFFIC MEASUREMENTS

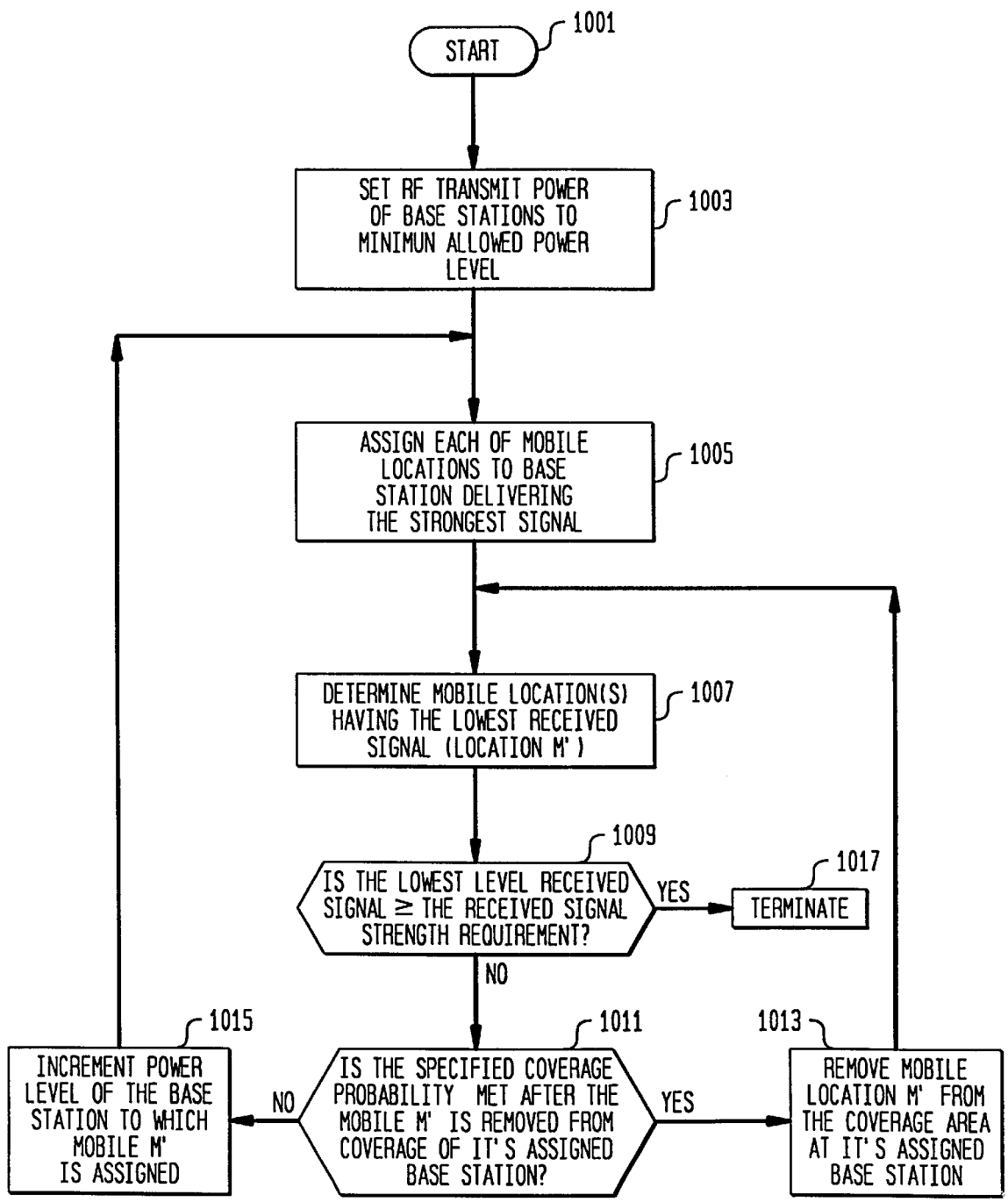

METHOD FOR SELF-CALIBRATION OF A WIRELESS COMMUNICATION SYSTEM

REFERENCE TO RELATED APPLICATION

This is a division of Ser. No. 08/736,871 filed Oct. 25, 1996, is a continuation in part of U.S. application Ser. No. 08/634,713, filed Apr. 18, 1996.

FIELD OF THE INVENTION

This invention relates to wireless/cellular radiotelephone systems and in particular to a method for self configuration, the autonomous assignment by the system of frequencies/channels to cells within the system, and a method for self calibration, the autonomous determination by the system of base station transmit power settings. Both rely on measurements collected by the system. In a particular illustrative embodiment, functionalities of the IS 136 Air Interface Standard MAHO/MACA are utilized to acquire the needed measurements. Specifically a self-configurable/calibratable wireless system utilizes an existing functionality of the cell site, specified by IS 136, to instruct its registered mobiles to measure received signal strength on specified channels in order to collect downlink signal strength measurements between mobiles and base stations.

BACKGROUND ART

The service area of a wireless communications system is partitioned into connected service domains known as cells, where radio telephone users communicate, via radio links, with the base station serving the cell. The base station (BS) is coupled to the land network. Efficient use of the available radio frequency spectrum is achieved through the reuse of the same radio frequencies in designated co-user cells that are sufficiently separated by distance so that the combined interference generated by co-channel and neighbor-channel cells is below tolerable levels.

Historically, the assignment of radio frequencies (or channels) to cells has been based on regularity assumptions (i.e., equal-sized regularly-spaced cells with uniformly distributed traffic loads), which enable the adoption of simple rules for identifying co-user cells, and for partitioning the RF spectrum into channel sets. However, because such regularity assumptions often do not hold, and thus the rules of regular channel assignment do not lead necessarily to the efficient utilization of the RF spectrum, a channel assignment approach, known as non-regular channel assignment, has evolved for to address this deficiency. Both regular and non-regular channel assignment approaches can be classified as fixed channel assignment, which is characterized by a fixed relationship between cells and the channels serving them.

In contrast to fixed channel assignment methods, a new classification has been developed known as flexible channel assignment. Such flexible channel assignment methods, exploit the capability of a system for remote, software-driven, retuning of the base station radios, which capability enables channel capacity to adapt to traffic variation.

Wireless systems are generally migrating toward digital technologies from traditional analog wireless systems, although it is expected that analog systems will continue to serve a significant population of users for some time yet. In the digital environment, three candidates are emerging: Time-Division Multiple Access ("TDMA"), Global System for Mobile (GSM), and Code-Division Multiple Access ("CDMA"). The first two involve narrow-band channels that can carry, in separate time slots, three or eight conversations each, respectively. The latter uses wider channels that accommodate many users at once and can be re-used in abutting cells. From a service provider's perspective, one of the fundamental differences between the two technologies is the need for channel assignment in the former, a requirement that is absent in the latter. As is apparent from the following discussion, channel assignment is very much a requirement for the analog system is used today.

The channel assignment function, as carried out in the prior art, is characterized by both the need for advanced planning of such channel assignments and a requirement for considerable data gathering. Additionally, such traditional channel assignment planning tends to achieve sub-optimal traffic loading in the cells of a wireless system, as well as sub-optimal traffic throughput in such a system. Associated with the channel assignment is setting or calibration of cell base station RF transmit power.

A self-configurable wireless system is one in which data is collected and channels are assigned to cells autonomously. The collected data provides information needed for channel assignment. Such a system is disclosed in the parent application Ser. No. 08/634,713, filed Apr. 18, 1996.

SUMMARY OF THE INVENTION

In a wireless communication system embodying the principles of the invention, frequency/channel assignments to cells are self configured and RF transmit power levels are self calibrated by using data collected by the wireless system determined by system functionalities as part of the self-configuration process.

The data required for self configuration and self calibration consists of signal strength measurements between mobiles and base stations. The measurements can be made either on the uplink or the downlink. Software coordinates the data collection, RF power setting and channel assignment.

In one illustrative embodiment of the invention, the required data is supplied automatically from MAHO/MACA (i.e., Mobile Assisted Hand Off; Mobile Assisted Channel Assignment) functionalities of the IS 136 Air Interface Standard (AIS), thus making an IS 136 system capable of self configuration and self calibration without additional hardware.

Specifically the system is initially started with preliminary data. Signal strength measurements can thus be made to provide a collection of data that is adequate for the efficient execution of the self configuration and self calibration algorithms.

BRIEF DESCRIPTION OF THE DRAWINGS

FIG. 10 is a flow process diagram of a self calibration process to set RF transmit power levels.

DETAILED DESCRIPTION

1. Introduction

Figure 1:
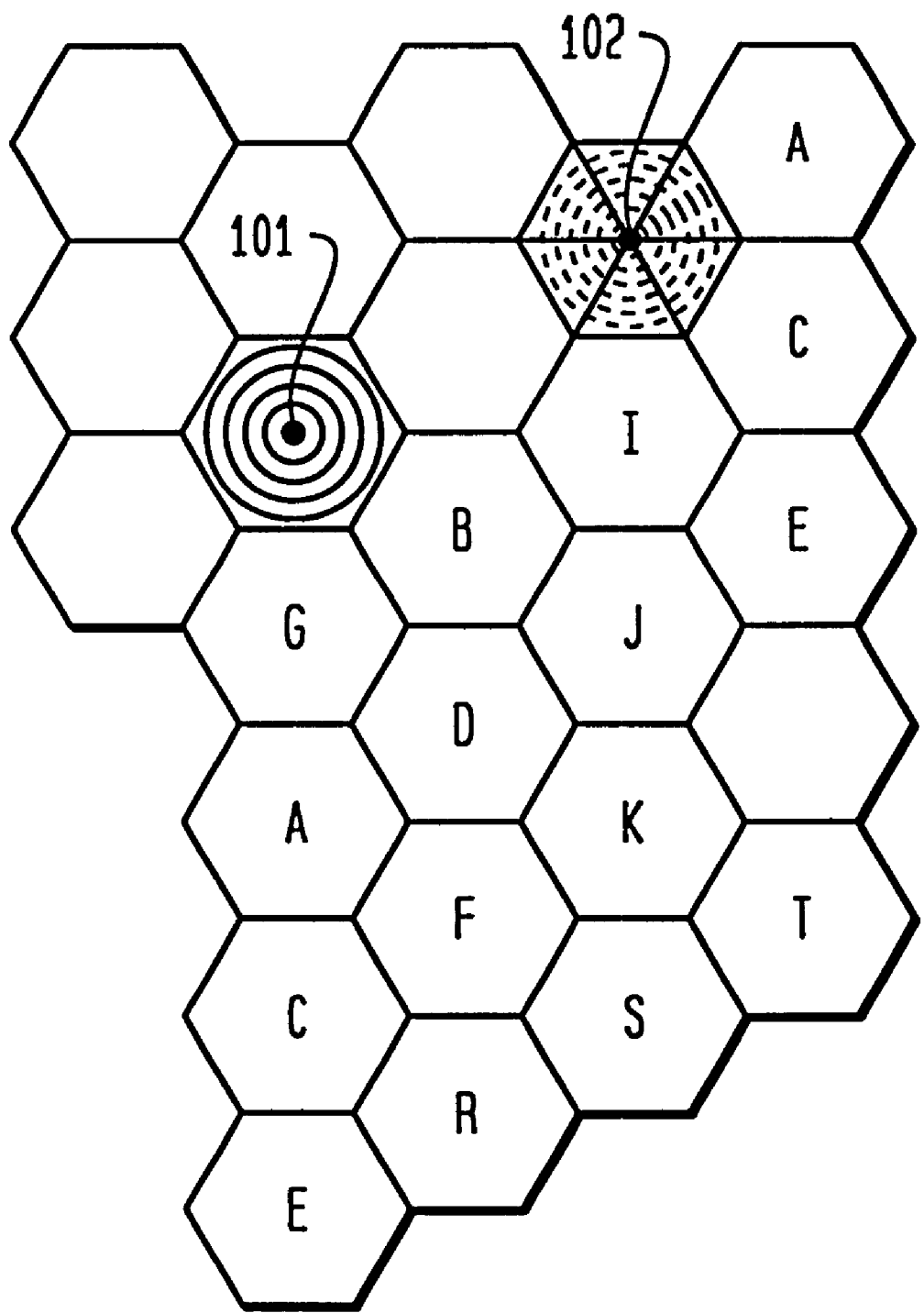
FIG. 1 is a schematic of a regular cell area layout of a wireless/cellular radiotelephone system.

A conventional regular hexagonal cell layout of a wireless cellular communications system is shown in schematic form in FIG. 1. Depicting the geographical service area in terms of a hexagonal grid establishes a geometric pattern that permits frequencies to be assigned in a patterned disposition allowing the reuse of those frequencies in a controlled repeatable regular assignment model. The cell areas each have specific channel sets assigned to them. Each channel set comprises a plurality of individual transmit and receive radio channels for use within the cell area. In the model shown in FIG. 1, cells marked "A" are co-user cells and all use the same channel set. The same is true for co-user cells marked "B", "C" etc., each of which has its own assigned channel set.

Each cell is radiated by an antenna system associated with a base station, which base stations may be interconnected with each other and/or with other networks. In the exemplary configuration illustrated in FIG. 1, an omni-directional radiation pattern is depicted by antenna 101 and a directional antenna pattern, representing sectorization of cells into smaller wedge type service areas, is represented by antenna 102.

It is well known that a central aspect of cellular communications systems is the concept of frequency reuse. With frequency reuse, users in different geographical locations (different cells) may simultaneously use the same frequency channel, as depicted by commonly named cells in FIG. 1 for regular channel assignment. While frequency reuse can substantially increase spectral efficiency of a system, serious interference can occur between cells involved in the common use of the same channel in the absence of proper system design. Frequency reuse or channel assignments are generally implemented through the adoption of simple rules for identifying co-user cells and for partitioning the RF spectrum into channel sets.

Channel assignment methodologies can be broadly classified into the categories: fixed and flexible. Fixed channel assignment fixes the relationship between cells and the channels serving them. Only the channels allocated to a cell can serve calls in that cell, and each channel can be used simultaneously by all the cells to which the channel is assigned. An example of fixed channel assignment is regular channel assignment, which is characterized by the regular repetition of a reuse pattern. Regular channel assignment is optimal for a system with traffic distributed uniformly across cells.

When the traffic distribution is not uniform, an optimal fixed non-regular channel allocation can be found, which allocates channels to cells according to their traffic load. [A process for achieving such an optimal non-regular allocation is described in M. Benveniste, "Apparatus and Method for Non-Regular Channel Assignment in Wireless Communication Networks", U.S. Pat. No. 5,404,574.]

Flexible channel assignment methods, on the other hand, exploit the capability of a system for remote, software-driven, retuning of the base station radios, which capability enables channel capacity to adapt to traffic variation.

It is also well known that the quality of communication in wireless systems depends substantially on the ratio of the received signal to interference (S/I) or the bit-error-rate (BER), which depends, in turn, on the signal and interference received. The primary interference of concern consists of two components: co-channel interference and neighbor-channel interference. Co-channel interference is the interference from communication sources tuned to the same frequency as the operating channel. Neighbor-channel interference comes from communication sources using channels near the operating channel in the frequency spectrum. To achieve the desired voice or data transmission quality, the ratio of the received signal over the combined co-channel and neighbor-channel interference must be above a specified threshold. RF transmit power levels are also a factor in determining interference.

A methodology is described, below, whereby a channelized wireless system, can avoid the need for channel assignment planning. Instead the system makes its own channel assignment determinations without the need for advance planning or human intervention. The implementation of that methodology is characterized herein as a self-configurable wireless system.

Hereafter a methodology is also described whereby a channelized wireless system can avoid the need for manual calibration of RF power transmission levels of a base station. In deed the system after an initial crude power setting self-calibrates without the need for operator intervention. This methodology is characterized by the term self calibration in which base station RF power setting reduces to software-based calculation employing the same system-collected data as self configuration. RF power level settings are determined so that they respect constraints that meet user-specified service and system performance criteria. Self calibration is continuous. It stops when the system reaches a steady state.

A self-configurable self-calibrating system, in accord with the invention, encompasses autonomous channel assignment and autonomous RF transmit power level setting for the base stations. Self-configuration automatically assigns channels to cells in a manner to avoid channel interference. It involves establishment of channel assignment admissibility criteria, which determine whether the simultaneous use of a channel by a collection of base stations (or their mobiles) is permissible. Such criteria can be used also to establish a neighbor list. Self calibration is concerned with setting RF transmit power levels of base stations at a minimum level.

In a wireless system capable of self configuration and self calibration, RF planning is reduced simply to the problem of selecting cell sites, and setting system configuration parameters. Everything else that has traditionally been part of RF planning when setting up a new system and expanding it will be guided by software that resides within the system equipment.

Self configuration and self calibration employ data that is collected by the system while in operation. This data consists of signal strength measurements between mobiles and base stations, while can be made either on the uplink or the downlink. In general, additional radios would be needed at the base station for the collection of this data. However, a wireless communication system operating under the IS 136 AIS, according to one aspect of the invention, may be implemented without any modification of the wireless system hardware architecture. The functionality of MAHO/

MACA provides the needed signal strength measurements without the need for added radios at the cell sites for this purpose. Indeed the necessary measurements may be made, on the downlink, by traveling mobiles upon receipt of the proper instructions. This process is coordinated by software that is added to the existing software.

2. Self-Configuration

I. Introduction

A self-configurable wireless system according to the invention offers two major advantages over prior art systems. Most obvious is the elimination of the channel planning process itself, and, thus, the elimination, or substantial reduction of the expert staff needed for that purpose—a significant cost benefit for the system operator. Second, the number of cell sites needed to serve a given traffic load can be significantly decreased. There are two mechanisms by which such a cell site reduction is achieved. One is through the system's ability to move channels where needed, as traffic loads vary in time. If traffic peaks shift across the system, the portability of channel capacity translates into fewer cell sites. The second is through increased traffic throughput, which is attainable even in static traffic conditions.

Self-configurability encompasses two key features:

autonomous data collection, and selecting a channel assignment methodology.

The first feature, autonomous data collection, pertains to the data needed for the administration of voice channels. It involves data characterizing the interference environment, and other data relevant to the specific channel assignment algorithm implemented. In the preferred embodiment, using an ADCA algorithm, such data will be the traffic load experienced in a cell. The interference data would be collected upon start-up of the system or after the addition of new cells or sectors. Both types of data can be collected during normal operation and without impact on the system's performance. Appropriate methods for such autonomous data collection will be known to those skilled in the art.

In a preferred embodiment of the invention, the selected channel assignment method is chosen from the class of flexible channel assignment methods, which, as already noted, exploit the capability of a system for remote, software-driven, retuning of the base station radios—that capability enabling channel capacity to adapt to traffic variation. It should be understood, however, that the methodology of the invention is also applicable to fixed channel assignment methods.

Flexible channel assignment methodologies comprise three categories: adaptive, dynamic, and adaptive-dynamic channel assignment, the last category being disclosed and described in the cross-referenced application designated M. Benveniste-6. A channel assignment algorithm of the adaptive -dynamic channel assignment (ADCA) category is identified herein for operation in a preferred embodiment of the self configurability methodology of the invention. That algorithm performs consistently better than the traditional channel assignment methods, and is compatible with current and planned cellular technology, infrastructure, and air-interface standards.

It is to be noted that the self configurability methodology, including self-calibration, of the invention, as well as the underlying channel assignment method, is applicable to analog, TDMA, GSM, TDMA-analog hybrid systems and GSM-analog hybrid systems. TDMA channels can be treated just like analog channels, so long as one allows three calls per TDMA channel (one on each of three time slots) and all three time slots are used by the same cell/sector. GSM channels will be treated similarly, recognizing that each channel has eight call slots.

II. Channel Assignment

As noted above, for the preferred embodiment of the invention, the channel assignment method is selected from the class of flexible channel assignment methodologies, which class includes the particular categories: adaptive, dynamic, and adaptive-dynamic. Herein, a brief discussion is provided as to those flexible channel assignment categories.

A. Adaptive Channel Assignment

An adaptive channel assignment ("ACA") algorithm adjusts channel assignments to traffic by recomputing the optimal non-regular channel allocation for different time periods, using observed data to estimate expected traffic loads.

With ACA, a new channel allocation is recomputed when the traffic loads have changed in a statistically significant way to warrant recalculation. The time interval between successive channel re-allocations could range from half an hour to eight hours. Re-allocation will be triggered by a test that is equivalent to the rejection of the appropriate test of hypothesis. It provides the mechanism for adjusting to traffic trend variations. Adaptive channel assignment has no way of adjusting to traffic variations due to randomness. The relationship between channels and cells is fixed within the time interval between consecutive channel re-allocations, much like in non-regular channel assignment.

B. Dynamic Channel Assignment

Another method for adjusting to the variable demand for channels is dynamic channel assignment. Dynamic channel assignment dispenses altogether with the fixed relationship between channels and cells. More users may access a channel than would be possible to serve simultaneously. [See, e.g., L. G. Anderson, "A Simulation Study of Some Dynamic Channel Assignment Algorithms in a High Capacity Mobile Telecommunications System", *IEE Trans. Commun.*, Vol. 21, No. 11, November 1973; R. Beck and H. Panzer, "Strategies for Handover and Dynamic Channel Allocation in Micro-Cellular Mobile Radio Systems", Proc. *IEEE Vehicular Technol. Conference*, May 1989; L. J. Cimini, Jr., G. J. Foschini.] Because of its increased flexibility, a dynamic channel assignment algorithm can adjust to both randomly-induced variations in traffic and to trend changes.

With more users having access to a given channel, the channel's idle time can often be reduced. As is known to those skilled in the art, however, all dynamic channel assignment algorithms do not guarantee a capacity improvement relative to regular channel assignment. [See, e.g., Beck and Panzer, "Strategies for Handover and Dynamic Channel Allocation in Micro-Cellular Mobile Radio Systems" id.] Because the collection of users assigned a channel at a given point in time depends on the dynamics of call arrivals and terminations, the average distance between them may be greater than the minimum separation allowed for interference control reasons. The decrease in capacity, caused by a greater re-use distance, would cancel the potential gains arising from the greater flexibility in channel use.

C. Adaptive-Dynamic Channel Assignment

Adaptive channel assignment out performs regular channel assignment consistently, but it cannot take advantage of channel idle-time reduction, achieved when the restrictions on channel access are relaxed. Dynamic channel assignment, on the other hand, allows flexibility on the use of channels by different cells, but capacity losses may result at congestion because of the longer average re-use distance realized. Adaptive-Dynamic Channel Assignment ("ADCA") combines the best of the two approaches: the consistent non-inferiority of adaptive channel assignment with the ability of dynamic channel assignment to reduce channel idle time.

ADCA is adaptive channel assignment using a special form of dynamic channel assignment, channel borrowing. In traditional channel borrowing, channels are allocated to cells by the rules of regular channel assignment. [See, Anderson, "A Simulation Study of Some Dynamic Channel Assignment Algorithms in a High Capacity Mobile Telecommunications System", id.; J. S. Engel and M. M. Peritsky, "Statistically-Optimum Dynamic Server Assignment in Systems with Interfering Servers", *IEEE Trans. Commun.*, Vol. 21, No. 11, November 1973.] Cells will attempt to use the allocated channels first. If unavailable, other channels will be accessed. A channel that is used by a cell other than its owner cell will be referred to as a borrowed channel. A channel will be used by a cell only if interference restrictions are satisfied.

The channel borrowing algorithm in ADCA differs from traditional channel borrowing in that the channel allocation is not regular. It is non-regular, just as in adaptive channel assignment. Because of channel borrowing, ADCA can adjust channel capacity to randomly-induced variations in traffic, as. well as to traffic trend changes.

An illustration of this ADCA approach is presented in the cross-referenced application designated M. Benveniste-5, Ser. No. 08/401,387, filed Mar. 9, 1995, which describes application of channel borrowing (dynamic) to address changing capacity requirements in cells having non-regular channel allocations periodically re-determined (adaptive) by an optimum non-regular channel allocation methodology.

The ADCA algorithm which constitutes a preferred channel assignment method for the self configurability methodology of the invention is disclosed in detail in the cross-referenced application designated M. Benveniste-6, Ser. No. 08/634,320, filed Apr. 18, 1996. As shown in that referenced application, that ADCA algorithm can be described in terms of three basic functions: a Channel Acquisition Function, a Channel Release Function, and a Channel (Re-)Allocation Function. The Channel Acquisition Function is invoked when a call is started or handed off. The Channel Release Function is needed only if the algorithm permits channel re-arrangements. It is invoked whenever a call served by a channel allocated to the cell terminates or is handed off, thereby permitting the release of a "borrowed" non-allocated channel, with the call thereon being transferred to the newly empty allocated channel. The Channel (Re-)Allocation Function finds the way channels should be allocated in the system so that the number of channels allocated to each cell or sector meets a chosen criteria. For example, the number of allocated channels is proportional to the number of channels needed, and their ratio is maximum. The function is invoked when the channel allocation must be (re) computed.

All functions employ the serving signal and interference statistics. These statistics are estimated from data collected by the system. Other information needed by the first two functions is the allocation status of channels for each cell, which is supplied by the third function.

III. Criterion for Admissibility of a Channel Assignment

In most of the existing dynamic channel assignment algorithms, admissibility of a new call on a channel is determined by checking whether the channel is in use in any one of a specified list of neighbor cells. The list of interfering candidates is constructed by various methods, based either on real-time or a priori measurements, or on analytical modeling.

In some cases, the check of permissibility of co-channel use for a pair of cells/sectors is facilitated by the construction of a compatibility matrix, a square matrix of dimension equal to the number of cells/sectors in the wireless communications network. The elements of the matrix are either 1 or 0, indicating respectively whether or not a pair of cell/sectors can use the same channel simultaneously. Alternatively, when a graph-coloring approach to channel assignment is taken, a graph is constructed with nodes corresponding to the cells/sectors in the system, and edges connecting nodes corresponding to cells/sectors that cannot use the same channel at once.

With either representation, the existing algorithms rely on pairwise permissions to come up with a collection of cells/sectors that may use the same channel simultaneously. Since these permissions are derived without any information on other cells/sectors, they become more stringent than necessary. The result is suboptimal, as a number of feasible combinations of co-channel users may be excluded. Consider for instance the example of cells A and A' in FIG. 2. If one were to derive pairwise permissions for the simultaneous use of a channel based on the assumptions and criteria employed in adopting a re-use factor N=7 (that is, it is assumed that there are six other co-channel users at the minimum allowed distance from all A, as indicated by the dots in FIG. 2), these two cells would be denied permission to use the same channel. In a situation, however, whereby there exist no other cells in the neighborhood using the same channel, co-channel use by cells A and A' is allowable.

Accordingly, a new test for admissibility of a new channel assignment is disclosed herein wherein channel use is considered in all cells/sectors in the interference neighborhood of the cell/sector in question. An example (which appears in the cross-referenced applications designated Benveniste-5 and Benveniste-6) illustrates this approach.

The test for admissibility we propose for a new channel assignment considers channel use in all cells in the interference neighborhood of the cell in question. An example from reference [4] illustrates this approach. Alternative tests can be derived in a similar way employing the bit-error-rate as the measure of quality for a wireless connection.

In order to express algebraically the connection requiring that the signal-to-interference (S/I) ratio be above a given threshold value, we define the following terminology. Let

| | |
|---|---|
| $j = 1, \ldots, J$ | index of different cells |
| $i = 1, \ldots, J$ | same as j (the combination (i,j) designates a pair of cells) |
| $I_{ij}$ | co-channel interference contribution by dell i to cell j (random variable) |
| $S_j$ | signal strength at cell j (random variable) |
| $T$ | threshold level of the signal-to-interference ratio |
| $1 - \alpha$ | confidence level for S/I ratio requirement |
| $C_j$ | set of cells using the same channel as cell j |

The S/I ratio requirement can be posed as a probability statement as follows:

$$\text{Prob}\left[\frac{S_j}{\sum_{i \neq j, i \varepsilon C_j} I_{ij}} \geq T\right] \geq 1 - \alpha \text{ for all } j \varepsilon Cj \quad (1)$$

To write the above as an equivalent deterministic inequality, we need to know the probability distribution of the S/I ratio. Let Y be the value of this ratio, expressed in decibels. [For simplicity we have dropped the index j in the remainder of this appendix.] That is, $$Y = 10 \log_{10} \left[ \frac{S_j}{\sum_{i \neq j, \varepsilon C_j} I_{ij}} \right] \quad (2)$$

Following other treatments, we assume that Y is normally distributed. Let $\mu_Y$ and $\sigma_y^2$ be the mean and variance of Y, respectively, and let R be the S/I ratio threshold value T expressed in decibels. Equation (1) can be written as follows:

$$\text{Prob}[Y \geq R] = 1 - \text{Prob}\left[z \leq \frac{R - \mu_\gamma}{\sigma_\gamma}\right] \geq 1 - \alpha \quad (3)$$

where z is a normal random variable. The equivalent deterministic constraint is the following:

$$\mu_\gamma + z_\alpha \sigma_\gamma \geq R \quad (4)$$

where $z_a$ is the α-quantile of a normal random variable.

Equation (4) is the criterion for admissibility of a channel assignment. The values of $\mu_\gamma$ and $\sigma_\gamma$ depend on the composition of set $C_j$, the collection of cells considered for assignment of channel j. Their values are computed by using the assumption that the signals at all base stations, when expressed in decibels, are independent normally distributed random variables and that the cumulative interference in cell j is also normally distributed, when expressed in decibels. Let $$Y = P - L \quad (5)$$

where $$L = 10 \log_{10}\left[\sum_{i \neq j, \varepsilon C} I_i j\right] \quad (6)$$

$$P = 10 \log_{10} S_j \quad (7)$$

If $\mu_L$ the mean of the cumulative interference L in cell j, expressed in decibels $\sigma_L^2$ the variance of L $\mu_\rho$ the mean of the power signal P in cell j, expressed in decibels $\sigma_P^2$ the variance of P $\text{cov}^2(p,L)$ the covariance of P and L then, the mean and variance of Y are given by:

$$\mu_\gamma = E(Y) = E(P) - E(L) = \mu_\rho - \mu_L \quad (8)$$

$$\sigma_\gamma^2 = \text{Var}(y) = \text{Var}(P) + \text{Var}(L) = \sigma_\rho^2 + \sigma_L^2 - 2\,\text{cov}^2(P, L) \quad (9)$$

$\mu_P$ and $\sigma_P^2$ are parameters estimated from empirical data, which accumulate during the operation of the system. $\mu_L$, $\sigma_L^2$, and cov(P,L), which vary with the composition of the set $C_j$ are computed by a power-summing procedure. The statistical parameters employed in the power-summing computation are also estimated from empirical data.

Alternative tests may be derived in a similar way employing the bit-error-rate as the measure of quality for a wireless connection.

IV. Embodiment of a Self-Configurable Wireless System

A self-configurable wireless system according to the invention may be implemented without modification of the wireless system architecture. Instead, such implementation is carried out through a combination of software additions, modifications to existing software, and the addition of radios at the cell sites to provide signal strength and interference measurements. By thus building onto the existing system architecture, the present functionality that architecture is preserved, and accordingly a system incorporating the self configurability methodology retains the capability to switch between the present and the self-configurable modes of operation, if such a switch becomes necessary or desirable. In order to develop a proper understanding of the modifications to a wireless system contemplated by the invention, an illustrative example of an existing wireless system is first briefly described.

A. Present System Configuration

Figure 2:
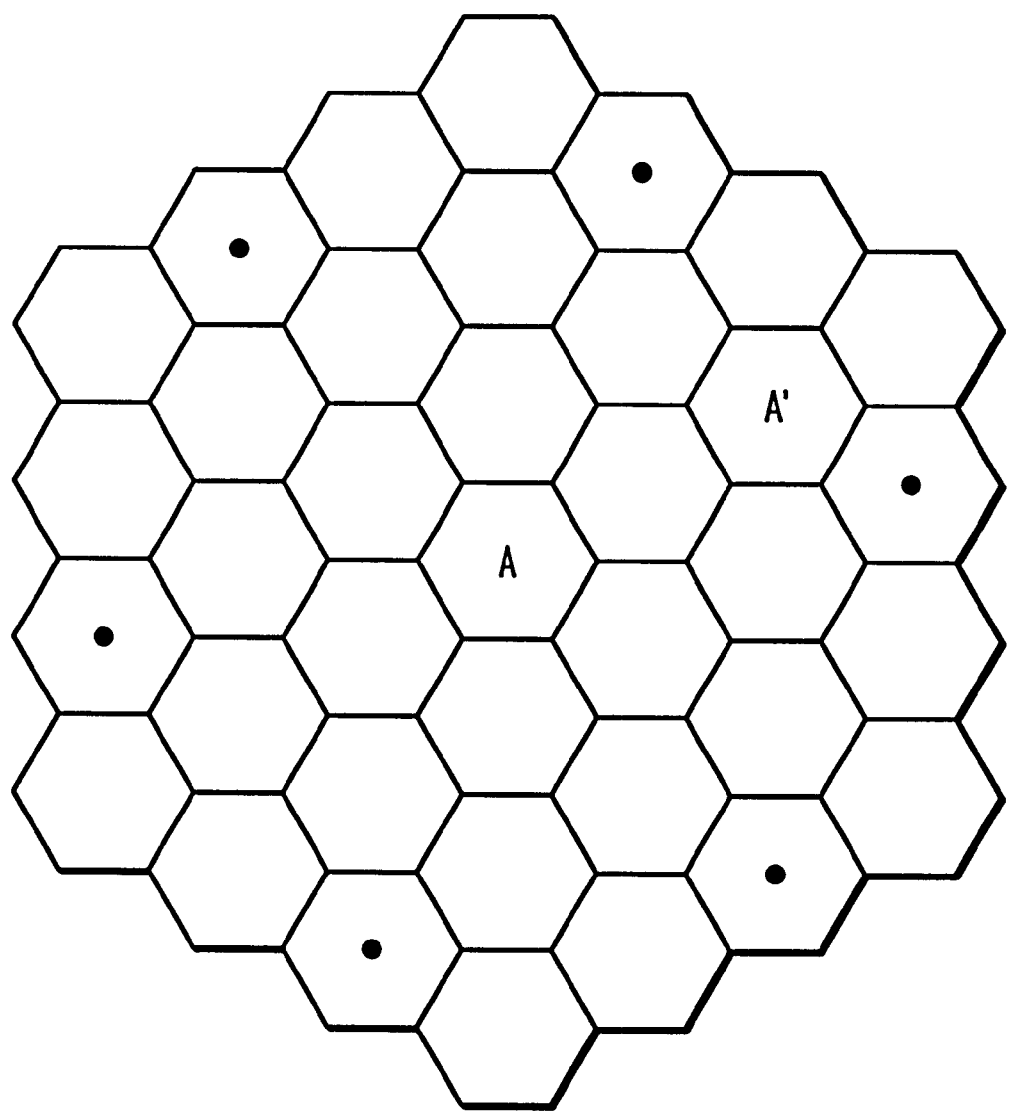
FIG. 2 is cell area schematic addressed to channel assignment admissibility.

A particular example of co-channel use is illustrated in the FIG. 2. As indicated in the parent application permissions for the simultaneous use of a channel with a reuse factor N=7, these two cells would be denied permission to use a common channel. Where no other cells in the neighbor hood use the same channel, co channel use by cells A and A' is allowable.

Figure 3:
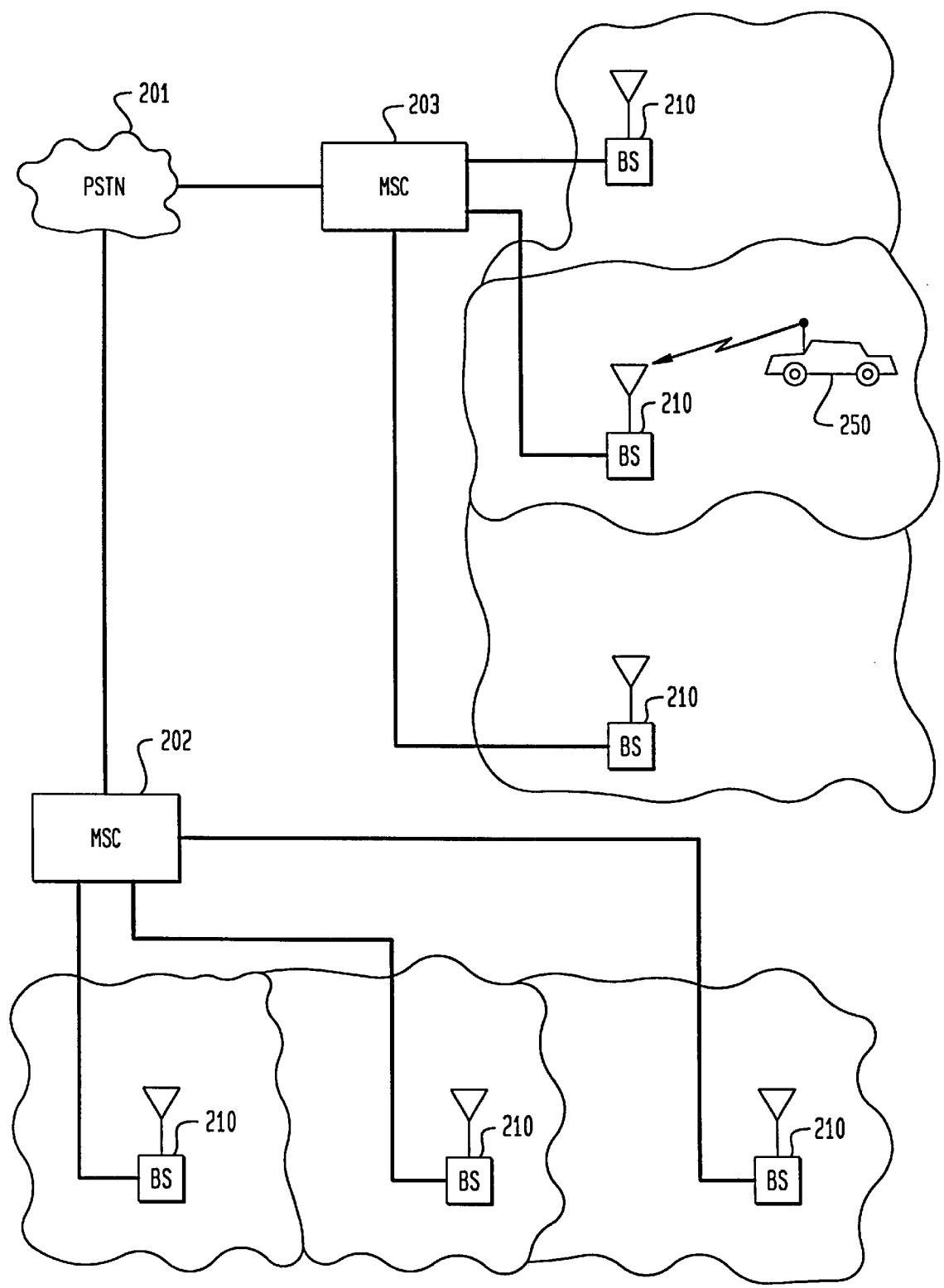
FIG. 3 is a block schematic of a wireless/cellular radiotelephone system.

A typical cellular system, to which the invention of self configurable (including self-calibration) may be utilized, is shown in the block diagram of FIG. 3. A plurality of mobile switching centers (MSC), 202 and 203, are shown connecting the mobile radiotelephone system to the public switched telephone network 201 (PSTN). The switching of the MSCs interconnects a plurality of base stations (BS) 210 each providing service to a cell coverage area. Each coverage area is shown as having irregular boundaries typical of an actual system. Each BS has radio transmit/receive equipment and radiating antennas to serve mobile radiotelephones 250 within its cell coverage area.

Figure 4:
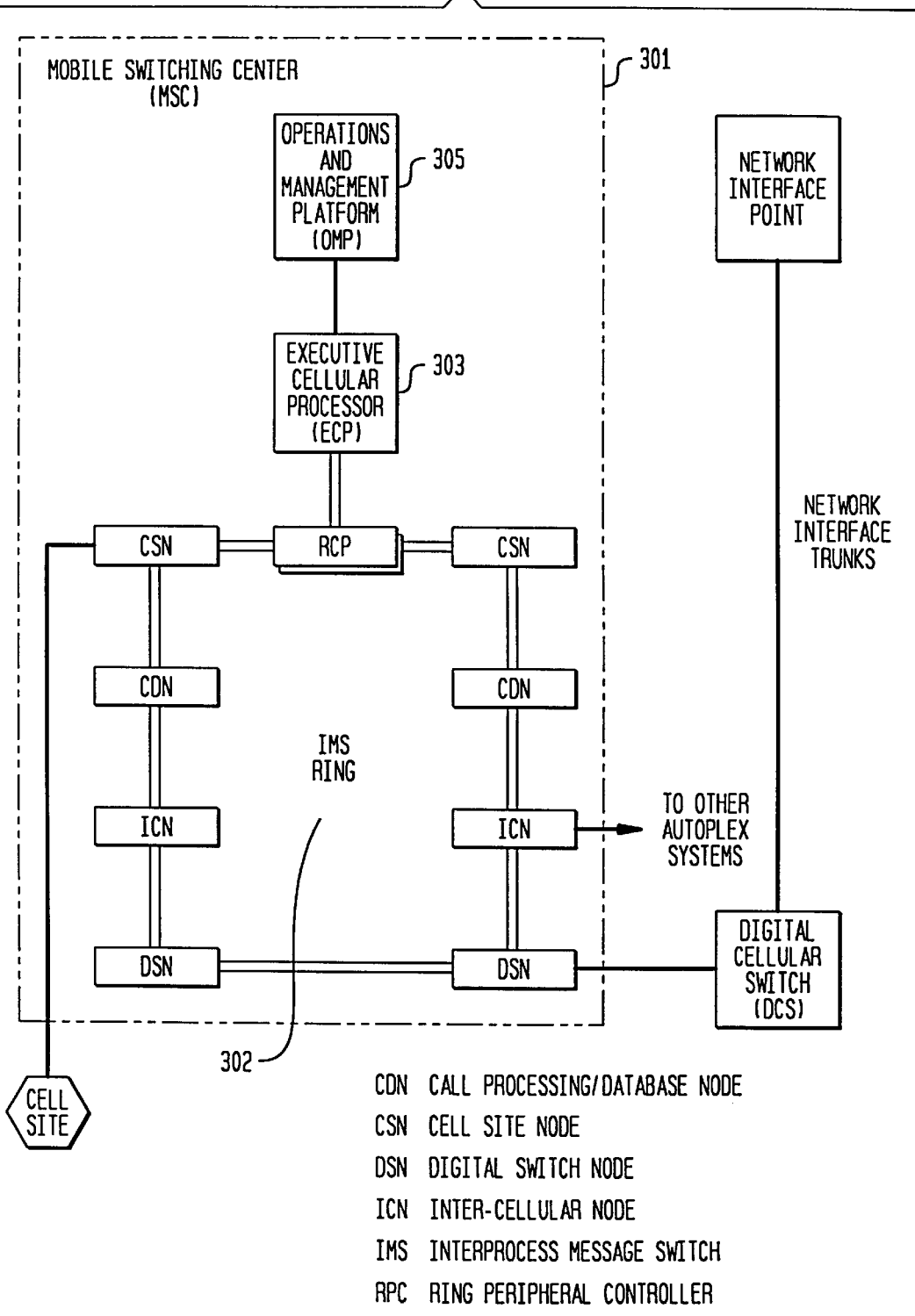
FIG. 4 is a block schematic of a mobile switching center for a wireless/cellular radiotelephone system.

In FIG. 4, the major functional elements of a Mobile Switching Center are illustrated. As will be seen in that figure, control of the call processing and channel assignment process resides in the MSC 301, which houses several processors linked to an Interprocess Message Switch (IMS) 302, in a token ring architecture. Channel assignment is performed by the Executive Cellular Processor (ECP) 303, in the Voice Channel Administration (VCA) module. Both fixed channel assignment and a simple dynamic channel assignment algorithm are typically available in the present VCA module.

Upon initialization of the system, VCA reads from a database the channel assignments that have been specified for all cells/sectors. VCA keeps a record of the voice channels available to a cell/sector and of their busy/idle status during system operation. When service is requested, an idle channel is selected, following one of the available "trunk hunt" algorithms. If the Dynamic Channel Assignment (DCA) option is employed, VCA marks the channels that are accessible by the DCA algorithm, and keeps track of the DCA-enabled/disabled status of a channel—i.e., whether a DCA channel is busy in an interfering neighbor cell. When a DCA channel is selected, it is marked DCA-disabled in the neighbor cells.

The ECP is also responsible for OA&M functions, which include the collection of service measurements. For instance, the number of offered calls, call hand-off requests, blocked calls, and dropped calls are tallied by the cell sites, and are periodically up-loaded to the ECP. A faster processor, the Operations and Management Platform (OMP) 305, adjunct to the ECP, assists the ECP with the OA&M functions. The OMP is fully responsible for the collection of service measurements.

B. Self-Configurable System Configuration

Figure 5:
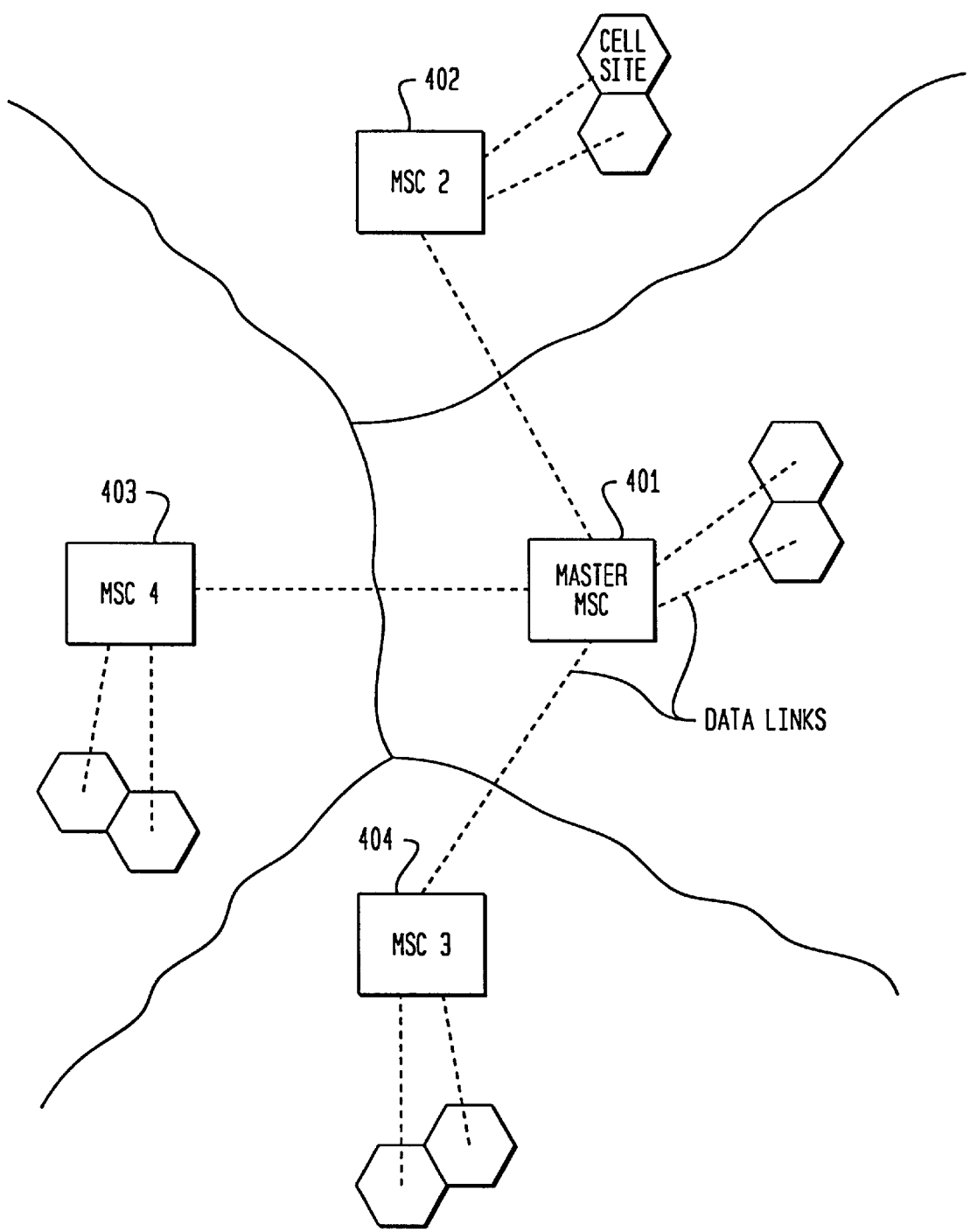
FIG. 5 illustrates a plurality of mobile switching centers configured according to the method of the invention.

For the self-configurable wireless system of the invention, channel assignment will, in a preferred embodiment, remain centrally controlled. In a multi-MSC system, such as depicted in FIG. 5, the channel assignment function will be implemented in a two-level hierarchical architecture. As illustrated in the figure, an MSC, designated the Master MSC 401, will operate to compute the channel allocation for the entire system. The remaining functions—e.g., traffic load, serving signal and interference statistics estimation—will be controlled by the serving MSCs 402, 403 & 404 (including also the Master MSC as to its own service area).

Figure 6:
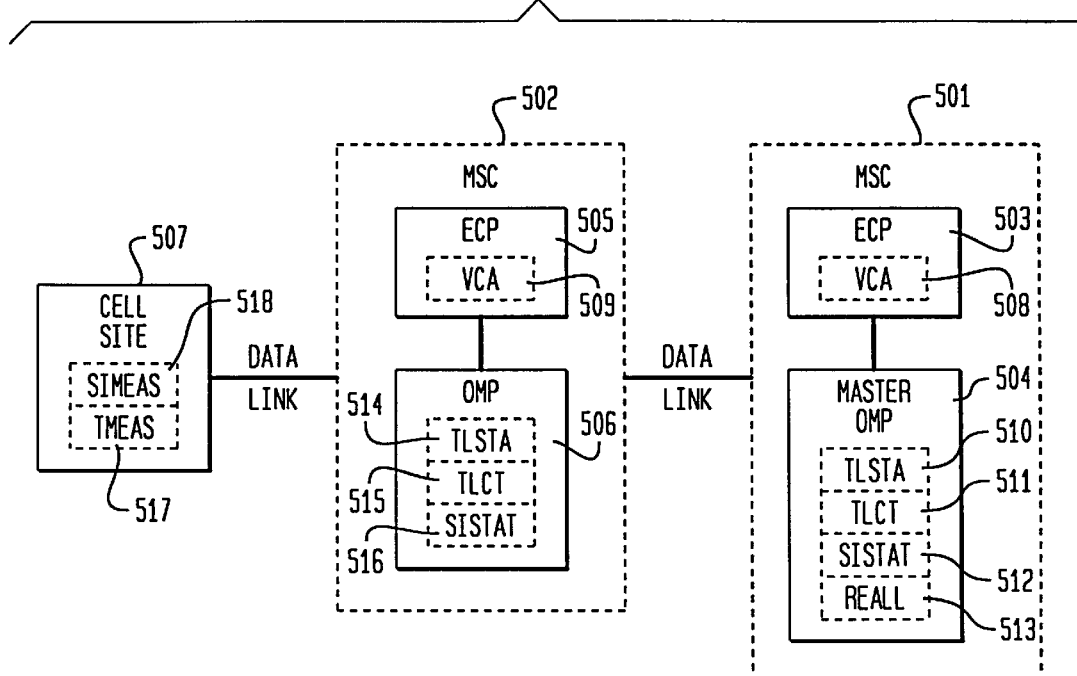
FIG. 6 provides a functional depiction of a master and a serving mobile switching center according to the invention.
Figure 7:
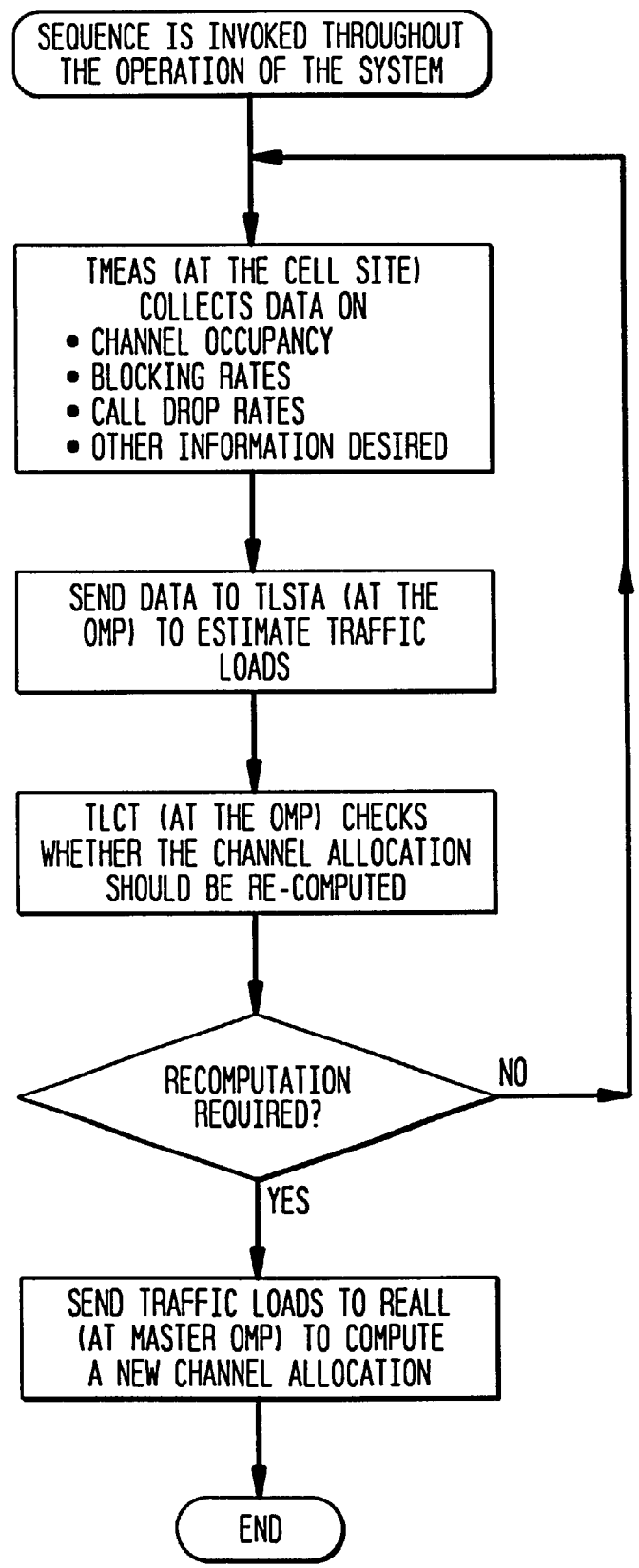
FIG. 7 is a flow process diagram of a traffic data collections method as implemented in the invention.
Figure 8:
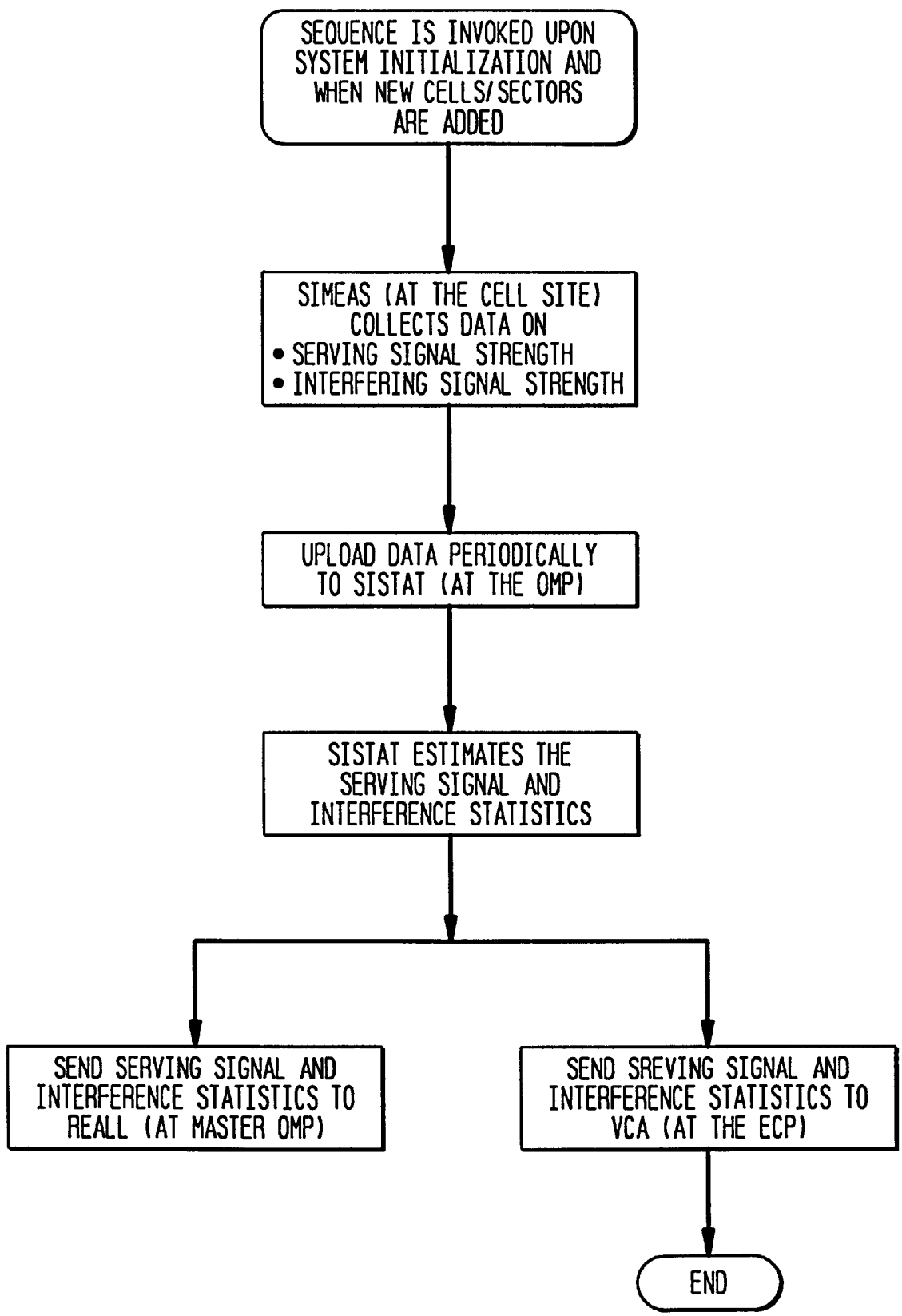
FIG. 8 is a flow process diagram of a serving signal and interference data collection method as implemented in the invention.
Figure 9:
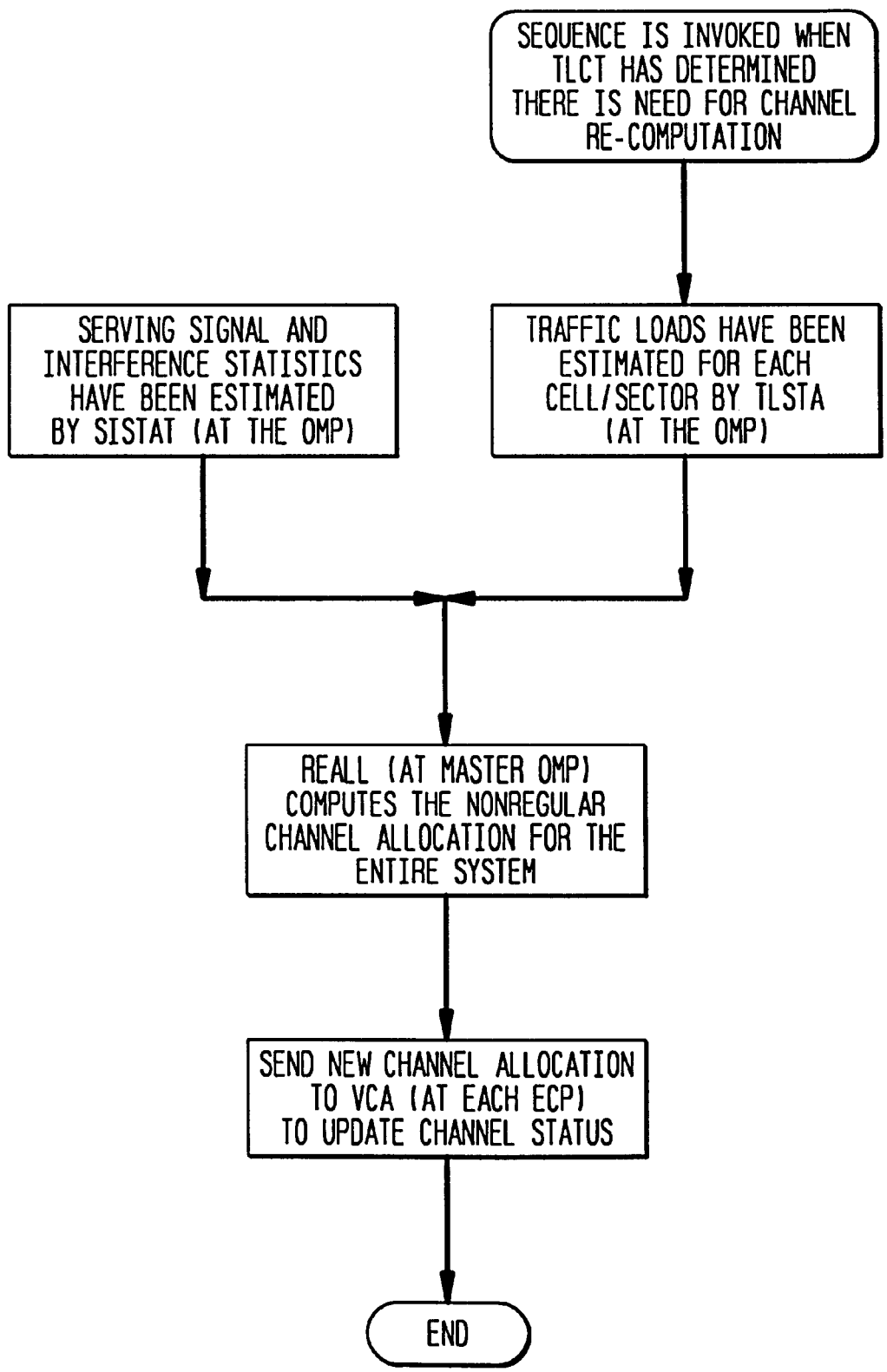
FIG. 9 is a flow process diagram of a channel (re) allocation method as implemented in the invention.

The functional relationships between the master MSC, a serving MSC and a cell site are illustrated in FIG. 6. Within an MSC, responsibility for the new functions implemented in accordance with the invention will be shared by the ECP and the OMP, and new data gathering functions are carried out by the cell sites. The functions of the inventive methodology, and their inter-relationship are described in the sub-sections following, and are depicted in flow diagram form in FIGS. 7–9.

(1) The ECP

In the ECP, VCA will operate as presently, with modifications and additional features as described herein. A basic change is the elimination of a one-to-one correspondence between radios and voice channels. Each cell/sector will have access to more channels than the number of radios at the cell site. When a channel-radio request is received, VCA will select both, a voice channel and a radio, and will instruct the cell site to tune the selected radio to the selected channel. The radio selection procedure remains unchanged, but voice channel selection by the VCA is modified in the system of the invention.

VCA will keep a list of the channels accessible by a cell/sector, as done presently, and will keep track of the channel allocation status that is, whether a channel is allocated or non-allocated to a cell. This information will be supplied by the OMP and will be updated every time a new channel allocation is computed. That channel (re)allocation process is shown in the flow diagram of FIG. 9. All channels accessible by a cell will be marked as DCA channels. Charuel selection and release will follow the logic of the Channel Acquisition and Channel Release Functions, described in the introductory section above, and more particularly in the cross-referenced application designated M. Benveniste-6, Ser. No. 08/634,320, filed Apr. 18, 1996.

In order to determine whether an acceptable S/I ratio, or BER, will be maintained for a given channel assignment, VCA will keep track of the total interference experienced on each channel at each cell. This quantity will be updated as channels are acquired or released, and will be computed using the relevant statistical parameters. The statistical parameters needed for the estimation of the S/I ratio or BER will be supplied by the OMP, and recorded by VCA for each cell/sector. These parameters will change only when there are system configuration changes or new cellslsectors are added. The process of determining serving signal and interference statistics is shown in the flow diagram of FIG. 8.

If channel re-arrangements are permitted, VCA will also maintain a counter of the number of re-arrangements performed on each call. In an alternative embodiment, VCA will include a timer for maintaining a record of the time interval since the last channel re-arrangement on each call so that minimum spacing is maintained.

(2) The OMP

As illustrated in FIG. 6, the OMP 506 will collect serving signal and interference measurements from the Serving Signal and Interference Measurements (SIMEAS) module 518 at a cell site 507, for the estimation of their statistical distribution parameters (i.e. mean, variance, and covariance) in the Serving Signal and Interference Statistics Estimation (SISTAT) module. These parameters are needed both by VCA, and for the calculation of a channel allocation. The serving signal and interference statistics are first computed at the time of a new system installation. Those statistics are then re-computed whenever there are system configuration changes or additions of new cells/sectors.

The OMP will also collect traffic data from the Traffic Measurements (TMEAS) module 517 at a cell site 507, and will estimate the offered loads in the Traffic Load Statistics Estimation (TLSTA) module 514. These estimates will be used by the Traffic Load Change Test (TLCT) module 515 to determine whether the traffic pattern has changed sufficiently to necessitate re-allocation of the channel. The process of determining such traffic load statistics and determining whether a new channel allocation should be computed is shown in the flow diagram of FIG. 7.

Finally, the Master OMP 504 determines the allocation of channels to cells, in the Computation of New Channel Allocation (REALL) module 513. In a preferred embodiment of the invention, this module carries out the adaptive-dynamic channel allocation algorithm described hereinbefore, and more particularly in the cross-referenced application designated M. Benveniste-6, Ser. No. 08/634, 320, filed Apr. 18, 1996.

In a multi-MSC system, it is desirable to compute channel allocations for all MSCs together in order to obtain best results. Since efficient algorithms exist for large systems it is possible to have a single OMP, the Master OMP, receive traffic, serving signal, and interference statistics from the other OMPs, and calculate the optimal channel allocation for the entire system.

(3) The Cell Sites

The self-configurable wireless system will utilize an existing function of the cell site, measurement of serving signals, in conjunction with a new function implemented at the cell site, collection of interference measurements. With the help of this invention, measurements of signals between base stations and mobiles are collected by employing the MAHO/MACA functionalities. The SIMEAS module in the cell will collect serving and interfering signal measurements, needed by the SISTAT module in the OMP, in order to estimate the statistical distribution parameters to be used by the REALL module in the Master OMP, and VCA in the ECP. The home base stations of registered mobiles will instruct these mobiles to tune to a specified control channel and measure received signal strength.

C. Statistical Parameter Estimation

The admissibility of a given channel assignment requires knowledge of the serving and interfering signals at a mobile and base station receiver, regardless of whether the admissibility criterion is posed as a deterministic or probabilistic statement. In the method of the invention, the necessary parameters are derived from measurements performed at the base station during, and without interfering with, the normal operation of the system. These are not real-time measurements of the serving and interfering signals for the call(s) for which feasibility of co-channel use is checked. These measurements serve as a sample, of a larger population, to be used for parameter estimation. Hence, they may be collected selectively, and once a sufficient sample size has been collected, signal strength measurement may cease, to be resumed again only when new cells/sectors are added or when system configuration parameters are modified. Only a subset of parameters, near the immediate neighborhood of the system change, need to be re-estimated since system changes have only a local impact.

Section III above provides an example of a test for admissibility of a candidate channel assignment. In the preceding section the configuration of a wireless system capable of collecting serving and interfering signal measurements during normal operation was described. In this section, it is shown how the needed statistical parameters can be estimated from collected signal strength measurements.

Consider, as an illustrative example, that the parameters desired to be estimated are:

$\mu_j$ mean of the serving signal in logical cell j $\sigma_{j_2}$ variance of serving signal in logical cell j $\mu_{ij}$ mean of the interfering signal from logical cell i to logical cell j $\sigma_{ij}^2$ variance of the interfering signal from logical cell i to logical cell j $\text{cov}_{ikj}^2$ covariance of the interfering signals from logical cells i and k to logical cell j Signals measured on either the uplink (from the mobile to the base station) or the downlink (from the base station to the mobile) can be used for parameter estimation in both directions, provided the proper power scaling has been applied in order to normalize the signal. In the discussion following, it is assumed for simplicity and without loss of generality that all signals are measured on the up link, in decibels, and have been normalized. It is further assumed that the following signals are available for the estimation of the above listed parameters. Denote the nth individual measurement of the signal received from a mobile served by cell j as DSj(n), n=1, ..., N, and the signal received by cell j from mobiles served by cell i as DIij(n), n=1, ..., N. Then the following formulas can be used to estimate the uplink parameters discussed above.

$$\mu_j = \frac{1}{N} \sum_{n+1}^{N} DS_j^{(n)} \tag{10}$$

$$\sigma_i^2 = \frac{1}{N-1}\left(\sum_{n=1}^{N} DS_j^{(n)2} - N\mu_j^2\right) \tag{11}$$

$$\mu_j = \frac{1}{N} \sum_{n+1}^{N} DI_j^{(n)} \tag{12}$$

$$\sigma_i^2 = \frac{1}{N-1}\left(\sum_{n=1}^{N} DI_j^{(n)2} - N\mu_{ij}^2\right) \tag{13}$$

$$\text{cov}_{ikj}^2 = \frac{1}{N-1}\left(\sum_{n=1}^{N} DI_j^{(n)} DI_{kj}^{(n)} - N\mu_{ij}\mu_{kj}\right) \tag{14}$$

The same formulas apply to downlink parameters provided one uses downlink measurements. When using uplink measurements, it is sufficient to note the relationship between the uplink and downlink signals. If the uplink and downlink measurements of a signal q are denoted as u(q) and d(q), respectively, then the following relationships hold:

$$u(DS_j) = d(DS_j) \tag{15}$$

$$u(DI_{ij}) = d(DI_{ji}) \tag{16}$$

(1) Computational Considerations

The following relationships can be used as shortcuts, in order to avoid recomputation of some of the parameters:

$$u(\mu_j) = d(\mu_j) \tag{17}$$

$$u(\sigma_j^2) = d(\sigma_j^2) \tag{18}$$

$$u(\mu_{ij}) = d(\mu_{ij}) \tag{19}$$

$$u(\sigma_{ij}^2) = d(\sigma_{ji}^2) \tag{20}$$

There is no simple relationship between downlink and uplink covariance of the signals of two logical cells interfering with a third. Both need to be computed.

The estimation of the necessary statistical parameters does not require the retention in memory of all the sample data. Retention of the following statistics is sufficient:

$$\sum_{n=1}^{N} DS_j^{(n)} \tag{21}$$

$$\sum_{n=1}^{N} DS_j^{(n)2} \tag{22}$$

$$\sum_{n=1}^{N} DI_{ij}^{(n)} \tag{23}$$

$$\sum_{n=1}^{N} DI_{ij}^{(n)2} \tag{24}$$

$$\sum_{n=1}^{N} DI_{ij}^{(n)} DI_{kj}^{(n)} \tag{25}$$

Hence, upon completion of a new measurement a simple multiplication and/or addition is performed to update the relevant statistics above. The measurement can then be discarded.

Finally, interference parameters need not be estimated for all possible combinations of cells. These parameters will be estimated only for the cells within the interference neighborhood of each cell.

D. System Initialization Conditions

A self-configurable wireless system will perform its own channel assignment and collect the needed data during normal operation. But, until the system is up and running, there is no data available with which to get started. In order to begin operation, a simple set of input data can be supplied. For self configuration, this data consists of the pairs of cells/sectors that may not use the same channel concurrently.

To see that this set of data is indeed adequate, consider the illustrative embodiment of the invention discussed above. VCA needs the following data: the allocation status of channels in each cell, and the serving signal and interference statistics needed to determine whether the Channel S/I or BER meets a specified requirement before selecting channels. The allocation status of channels, though necessary to efficient operation of the system, is not necessary for the execution of VCA and, hence, it can be omitted at system start-up. All channels will thus be initially given "non-allocated" status. As the system runs, it will accumulate the data needed for the computation of a channel allocation.

The channel S/I or BER determination, on the other hand, requires data in respect to the serving signal and interference statistics, which data are not available until the system has been running for a while. Knowledge of the pairs of cells/sectors that may not use the same channel concurrently, however, is sufficient to ensure compliance with the S/I or BER requirements and adequate to get the system going. Improved data will accumulate with system operation.

The required initialization data can be supplied by the operator. Alternatively this data can be collected autonomously by a system whose base station radios are able to receive signals from other base stations. By engaging in peer signal strength measurement, one can assess whether a pair of base stations can use the same channel simultaneously.

Similarly, initial RF power transmit levels can be provided by the operator to get the system running. Such data will enable initial operation of the system. As the system collects data during its operation, self-calibration will provide eventually the efficient RF power levels, according to the invention.

The requirement for system initialization does not detract from the benefits of self configuration and self-calibration, as these data requirements are far simpler than the elaborate RF planning employed currently. Moreover, starting system operation with crude data (that lead to sub-optimal parameters) does not compromise the quality of early operation.

Using the invention in this patent application, a system can start operation at maximum efficiency as follows. Once the initialization data has been specified, the system can start collecting the data necessary for self configuration and self-calibration by recording signal strength measurements between base stations and mobiles, but not of customer mobiles. At that point, mobiles under the control of the operator can be moved about the system serving area for the express purpose of collecting the needed data. The system need not know that the mobiles do not represent customer calls. Once sufficient data has been collected (and the optimal parameters have been estimated), customer calls will be allowed into the system.

In a general system (like an analog or IS-54 system) the mobiles used for initialization must be engaged in a call. In an IS-136 system, however, it is sufficient to have the mobiles registered. According to the invention claimed in this application, the MACA functionality of the IS-136 Standard can be used to provide the necessary data with the mobiles in idle mode.

3. Self-Calibration

The objective of self-calibration is to set the power level of each base station at the lowest level that will enable the base stations to deliver collectively an adequate signal strength to the serving area with a specified probability. Power levels are determined from the coverage area of a base station, which will be determined by the model. The serving area is represented by the collection of the locations of the mobiles whose signals were measured during self configuration. The model assigns these locations to the base stations optimally, thereby determining the coverage area of each base station, and in turn its required RIF power.

The self-calibration problem can thus be viewed as a special case of the stochastic "Set Covering" problem. Namely, Problem Statement: Given the distinct mobile locations representing the service area, we wish to assign mobile locations to base stations, and determine the least power level needed by the base stations in order to deliver to the mobile locations assigned to them, with a specified probability, a signal of desired strength.

From the collected data, we derive a distinct set M of mobile positions indexed by m. Then using the signal strength measurements, $DI_{ij}^{(n)}$ and $DS_j^{(n)}$, we determine the relative propagation loss $a_{mj}$ of the signal from mobile position m to base station j. The following mathematical programming model can be formulated to find the optimal base station power levels. Let Q the received signal strength requirement
β the confidence level at which the received signal strength requirement should be met
$a_{mj}$ the signal attenuation from mobile position m to base station j.

We will solve for the following unknown variables:
$p_j$ the power level of base station j
$p_{MAX}$ the worst-case power level
$x_{mj}$ a binary variable that equals 1 if mobile position m should be covered by base station j; 0, otherwise The self-calibration problem is posed as follows:

$$\text{Min} p_{MAX} \tag{26}$$

$$S.t. \ p_{MAX} \geq p_j \text{ for all } j \tag{27}$$

$$a_{mj} p_j \geq Q x_{mj} \text{ for all } m \text{ and } j \tag{28}$$

$$\frac{1}{M_k} \sum_{m \in M_k} \sum_j x_{mj} \geq \beta \text{ for all } k \tag{29}$$

$$\sum_j x_{mj} \leq 1 \text{ for all } m \tag{30}$$

$$x_{mj} = 0, 1 \tag{31}$$

where $M_k$ are sets of mobile positions representing, for different k, different sub-areas of the serving area, whose union is the system serving area. $M_k$ is the cardinality of set $M_k$. In the simplest implementation of the model, there is a single sub-area encompassing the entire serving area.

By setting power levels to conform to these constraints the power levels $P_j$ will be forced down to a minimum usable value and yet a satisfactory signal will be delivered that covers the mobile area to be serviced with a probability β.

The expression in (26) is the objective of the optimization model; expressions (27) through (31) are the constraints. The constraints in (27) assign $p_{MAX}$ its value. By minimizing $p_{MAX}$ while complying with the constraints in (27), we will force all power levels $p_j$ down. The constraints in (28) ensure that the desired signal will be delivered by the serving base station. The constraints in (29) and (30), together, ensure coverage with a probability β. The constraints (30) are necessary in order to prevent mobile positions that can be covered by more than one base station from being counted twice in expression (29). The expression in (31) specifies the values that may be assumed by the decision variables $x_{mj}$.

Other constraints may be added to reflect additional requirements or objectives. If no additional constraints are added, the solution of this mathematical program can be obtained by the procedure shown in Table 1 below.

Table 1. An algorithm for the solution of the self-calibration problem

Step 1 Set the RF power level of all base stations equal to the minimum allowed level.

Step 2 Assign each mobile location to the base station delivering the strongest signal.

Step 3 Find among the covered mobile locations the location(s) m' with the lowest received signal.

Step 4 If the lowest received signal is not below the requirement Q, terminate.

Step 5 Otherwise identify all k=k' such that $M_{k'}$ contains mobile location m'. Remove mobile location m' from coverage by its assigned base station if the coverage requirements in constraint (29) can still be met. [This implies that constraint (29) was met with strict inequality for all k'.]

Step 6 If able to remove mobile location m' from the coverage area of its assigned base station, go to Step 3.

Step 7 Otherwise, increment the power level of the base station covering mobile location m' and go to Step 2.

End

The self calibration process is depicted in the flow chart of FIG. 10. The process begins at start terminal 1001 and as instructed by the instruction block 1003 the transmit power of the base stations are set to a minimum allowable value. Subsequent instructions of instruction block 1005 specify that mobile locations be temporarily assigned to base stations supplying the highest strength signal to it.

The received signal strength is evaluated in evaluation block 1007 to determine if it is equal to or exceeds the required received signal strength. If it is, the 5 self calibration process terminates, as instructed by block 1017. If the decision is that the received signal strength is not adequate, it is then determined per the instructions of decision block 1011 if the specified coverage probability is met after the removal of mobile m' from the coverage area of its assigned base station. If the specified coverage is met the mobile m' is removed from the coverage area of its assigned base station, as specified by instructions in block 1013. Process flow continues and returns to block 1007. If the coverage probability requirement is not met, the power level of the base station is incremented per the instructions of block 1015 and flow returns to block 1005.

The procedure described in Table 1 above can be employed with minor modifications when simple constraints are added to the formulation of the problem. For instance, if there is a maximum allowable RF power level that must be observed, Step 7 must check whether the newly computed power level meets that constraint. If not, the problem does not have a feasible solution, and the algorithm will terminate without finding one. Otherwise, Step 2 will be executed.

If more complex constraints are added, one can solve the resulting "Set Covering" problem by employing existing algorithms for the solution of such problems.

A self-configurable wireless system, according to the invention, will initially use simple approximate data to get up and running and then use signal strength measurements collected both in order to better determine the RF power levels and for channel assignment purposes. This initial data may be input by an operator or determined from measurements collected when mobiles are moved around the service area under the control of the operator. When the system is up and running, data accumulates and the self configuration and self calibration processes are refined.

Conclusion

Herein has been described a novel system and method for the automatic self configuration of channel assignments and self-calibration of RF transmit power levels of a wireless communications system. Thus, self configuration and self calibration need no longer be an activity that must precede the installation of a new system or its expansion. Implementation of such systems is entirely within the capabilities of current technology and air-interface standards. The existing wireless system architecture can be preserved in a way that will make it possible to switch, if necessary, between the present "manual" and an autonomous mode of operation. Although the present embodiment of the invention has been described in detail, it should be understood that various changes, alterations and substitutions can be made therein without departing from the spirit and scope of the invention as defined by the appended claims. In particular, it should be noted that while the described embodiments of the invention have generally been characterized in terms of channel assignments and RF power transmit levels in TDMA systems, it is to be understood that the same techniques may be applied to power setting in CDMA systems and analog systems, as well as to GSM systems. They will also be applicable to hybrids of two or more of such systems. It should be understood as well that the methodology of the invention will also be applicable to micro-cellular systems, including intra-building systems.

The invention claimed is:

1. In a wireless communications system having service areas partitioned into a plurality of cells, wherein a set of communications channels are available for allocation among said cells and efficient operation of the system relies on parameters established based on data collected during system operation, said system comprising:

means for initiating system operation by specifying crude estimates of said parameters;

means for acquiring said data during system operation; and means for improving estimates of said parameters using the acquired data.

2. The system of claim 1, including:

means for using said parameters to determine the admissibility of channel assignments.

3. The system of claim 1, including:

means for using said admissibility criteria for the allocation of control channels.

4. The system of claim 1, including:

means for using said admissibility criteria for the allocation of traffic channels.

5. The system of claim 1, including:

means for using said parameters for determining a neighbor list of base stations of the system.

6. In a wireless communications system having service areas partitioned into a plurality of cells wherein a set of communications channels are available for allocation among the cells and efficient operation of the system relies on parameters estimated based on data consisting of signal strength and interference measurements between base stations and mobiles, wherein said data is collected during system operation, said system comprising:

means for initializing said parameters by specifying crude estimates of said parameters;

means for acquiring said data by moving operator-controlled mobiles, registered or engaged in calls, about the system serving area;

means for improving estimates of said parameters using the acquired data; and means for admitting client mobiles into the system.

7. The system of claim 6 wherein said parameters determine the admissibility of a channel assignment.

8. The system of claim 7 wherein said admissibility criteria are employed in the allocation of control channels.

9. The system of claim 7 wherein said admissibility criteria are employed in the allocation of traffic channels.

10. The system of claim 6 wherein said parameters determine RF transmit levels of the base stations on the control channel.

11. In a wireless communication system employing the IS 136 Air Interface Standard and having service areas partitioned into a plurality of cells, wherein a set of communications channels are available for allocation among said cells and efficient operation of the system relies on parameters estimated based on data consisting of signal strength and interference measurements between base stations and mobiles, wherein said data is collected during system operation, said system comprising:

means for initializing said parameters by specifying crude estimates of said parameters;

means for acquiring said data by moving operator-controlled mobiles about the system serving area;

means for improving estimates of said parameters using the acquired data; and admitting client mobiles into the system.

12. The wireless communications system of claim 11 wherein said parameters determine the admissibility of a channel assignment.

13. The system of claim 12 wherein said admissibility criteria are employed in the allocation of control channels.

14. The system of claim 12 wherein said admissibility criteria are employed in the allocation of traffic channels.

15. The wireless communications system of claim 11 wherein said parameters determine the Rf transmit power levels of the base stations on the control channel.

16. In a wireless communication system employing the IS 136 Air Interface Standard and having service areas partitioned into a plurality of cells, wherein a set of communications channels are available for allocation among said cells and efficient operation of the system relies on parameters estimated based on data consisting of signal strength and interference measurements between base stations and mobiles, wherein said data is collected during system operation, said system comprising:

means for initializing said parameters by specifying crude estimates of said parameters;

means for acquiring said data by moving operator-controlled mobiles about the system serving area by using functionalities of the IS 136 Air Interface Standard MAHO/MACA;

means for improving estimates of said parameters using the acquired data; and means for admitting client mobiles into the system.

17. A method in a wireless communication system employing the IS 136 Air Interface Standard and having service areas partitioned into a plurality of cells, wherein a set of communications channels are available for allocation among said cells and efficient operation of the system relies on parameters estimated based on data consisting of signal strength and interference measurements between base stations and mobiles, wherein said data is collected during system operation, said method comprising:

initializing said parameters by specifying crude estimates of said parameters;

acquiring said data by moving operator-controlled mobiles about the system serving area by using functionalities of the IS 136 Air Interface Standard MAHO/MACA;

improving estimates of said parameters using the acquired data; and admitting client mobiles into the system.

* * * * *